United States Patent [19]

Thom et al.

[11] 4,102,940

[45] Jul. 25, 1978

[54] WORKING UP POLYSILOXANE/POLYCARBONATE COPOLYMERS

[75] Inventors: Karl-Friedrich Thom; Günther Maass, both of Cologne; Manfred Beck, Odenthal, all of Germany

[73] Assignee: Bayer Aktiengesellschaft, Leverkusen, Germany

[21] Appl. No.: 747,264

[22] Filed: Dec. 3, 1976

[30] Foreign Application Priority Data

Dec. 11, 1975 [DE] Fed. Rep. of Germany ....... 2555746

[51] Int. Cl.$^2$ ............................................. C08L 43/04
[52] U.S. Cl. ................. 260/824 R; 528/197; 528/25
[58] Field of Search ....................... 260/824 R, 46.5 R

[56] References Cited

U.S. PATENT DOCUMENTS 3,819,744   6/1974   Buckner et al. ................ 260/824 R

*Primary Examiner*—Melvyn I. Marquis
*Attorney, Agent, or Firm*—Burgess, Dinklage & Sprung

[57] ABSTRACT

In the preparation and working up of a SiOC-linked polysiloxane/polycarbonate copolymer comprising reacting an α,ω-dihalogenopolysiloxane with an α,ω-dihydroxy-oligocarbonate in the presence of a tertiary amine and a solvent, and subsequently separating off the resulting copolymer from the reaction mixture additionally containing the amine, amine hydrochloride and organic solvent, the improvement which comprises subjecting the reaction mixture to steam distillation whereby the copolymer remains behind. Advantageously, the copolymer reaction solution is added to an aqueous solution having a pH of 7 to 8 whereby the amine and hydrogen chloride also distill over. If a surface active agent is present in the aqueous solution the product will be of very fine particle size.

3 Claims, No Drawings

WORKING UP POLYSILOXANE/POLYCARBONATE COPOLYMERS

The present invention relates to an improved process for working up polysiloxane/polycarbonate copolymers, which makes it possible to prepare the copolymers in a pure form and free from impurities.

SiOC-linked organopolysiloxane/polycarbonate copolymers are, as is known, industrially important products which can be employed in diverse ways. Processes for the preparation of such copolymers are described, for example, in U.S. Patent No. 3,189,662 and British Pat. Specification 1,351,399. However, the known processes exhibit a number of disadvantages during the working up of the copolymers.

Thus, the teaching in U.S. Pat. No. 3,189,662 is that, after reacting an α,ω-dichloropolysiloxane with an excess of 2,2-bis-(p-hydroxyphenyl)-propane ("bisphenol A") and subsequently phosgenating the reaction product in the presence of pyridine, isolation of the copolymer is carried out by precipitation, after removing the amine hydrochloride by filtration. This process is rather expensive because large amounts of solvent are required and these have to be worked up again. Moreover, the handling of these solvents requires considerable safety measures.

A further proposal for the preparation of the copolymers is described in British Pat. Specification No. 1,351,399. By reacting α,ω-dichloropolysiloxanes with α,ω-dihydroxy-oligocarbonates in the presence of pyridine, SiOC-linked organopolysiloxane/polycarbonate copolymers are again obtained. In this case, the polymer solution is worked up by filtering off the pyridine hydrochloride and subsequently removing the solvent by distillation. With this method of working up there is a danger that residual traces of amine hydrochloride remain behind, dissolved in the copolymer, and, at the working temperatures required for distillation of the solvent, result in decomposition reactions of the copolymers to give wax-like products.

The object of the present invention is to provide a process which permits SiOC-linked copolymers to be worked up in a simple manner without using large amounts of solvent and without causing decomposition reactions.

The subject of the present invention is an improved process for the preparation of SiOC-linked polysiloxane/polycarbonate copolymers by reacting an α,ω-dihalogeno-polysiloxane with an α,ω-dihydroxy-oligocarbonate and subsequently separating off the copolymer, which process is characterized in that the reaction mixture, consisting of the product of the reaction of the α,ω-dihalogenopolysiloxane with the α,ω-dihydroxy-oligocarbonate, an amine and the amine hydrohalide in an organic solvent, is subjected to steam distillation.

Surprisingly, it has been found that polysiloxane/polycarbonate copolymers can be prepared in a very pure form and in a simple manner when the copolymer is synthesized in an organic solvent and subsequently the solvent is removed by steam distillation. The desired polymer is then obtained in small flocks which can be processed readily.

From the state of the art steam distillation of a copolymer of the present type would have appeared nonsensical since it is known that Si-OC-linked polysiloxane/polycarbonate copolymers are highly susceptible to hydrolysis (compare block copolymers; D. C. Allpart, W. H. Janes, Applied Science Publishers Ltd., London 1973, page 341). However, as the examples hereinbelow show, the process according to the invention is a very advantageous route for isolating the copolymers.

α,ω-Dichloropolydiorganosiloxanes and polycarbonates are employed as the starting material for the preparation of the copolymers. The α,ω-dichloropolydiorganosiloxanes are obtainable according to known methods (compare, for example, Patent Specification 2,381,366, The disclosure of which is incorporated herein by reference); for example, α,ω-dichloropolydialkylsiloxanes and corresponding siloxanes which contain dialkylsiloxy and diarylsiloxy units in a statistical distribution are suitable. α,ω-Dichloropolydimethylsiloxane, which optionally also can contain vinyl groups, is preferred. The average chain length is preferably about 15 to 100 siloxane units but it is possible without difficulties to use chain lengths which are below or above this range.

The lower alkyl groups preferably have up to about 4 carbon atoms and methyl is preferred. The preferred aryl group is phenyl. Advantageously the alkyl groups constitute at least about 50 mole % of the total organo groups, with the balance constituting the aryl and/or vinyl groups.

The polycarbonates having terminal hydroxyl groups, which are to be used, preferably have a chain length of 2 to about 30 and preferably about 5 – 20 diphenylalkane units and can be derived from any desired "bisphenols". Preferably, the polycarbonate derived from 2,2-bis-(p-hydroxyphenyl)propane ("bisphenol A") is employed.

Further bisphenols which are suitable for the preparathio of polycarbonate are described, for example, in U.S. Pat. Nos. 3,028,365, 2,999,835, 3,148,172, 3,271,368, 2,970,137, 2,991,273, 3,271,367, 3,014,891, and 2,999,846, the disclosures of which are incorporated herein by reference.

The reaction can be carried out in all organic solvents in which the polycarbonates are soluble. Examples of preferred solvents suitable for this purpose are chlorobenzene or dichlorobenzene.

The concentration of the polycarbonate solution is about 5 – 40, preferably about 10 – 30, % by weight. Pyridine has proved particularly advantageous as the amine for taking up the hydrochloric acid formed during the reaction. However, other tertiary amines, such as, for example, triethylamine, are equally suitable. The reaction is usually carried out at temperatures between about 10° C and 150° C; preferably, the reaction is carried out at about 30° – 90° C. The pressure conditions are not especially critical; the reaction is preferably carried out under atmospheric pressure and a slightly reduced pressure or a slight excess pressure has no noticeable influence on the reaction.

In the simplest procedure, the working up according to the invention is carried out in such a way that the amine hydrohalide formed during the reaction is separated off and washed out and the copolymer solution is then subjected to steam distillation.

In a particular embodiment of the process according to the invention it is also possible to subject the entire reaction product obtained from α,ω-dihalogenopolysiloxane, α,ω-dihydroxypolycarbonate and amine to steam distillation without washing out the amine hydrohalide, if the aqueous phase into which the copolymer solution is metered for distillation is rendered slightly alkaline (pH: about 7 - 8). Bases which can be used for this pH adjustment are alkali metal hydroxides, oxides, carbonates or bicarbonates and alkaline earth metal hydroxides, oxides, carbonates or bicarbonates, such as, for example, NaOH, KOH, Na$_2$O, K$_2$O, K$_2$CO$_3$, KHCO$_3$, Na$_2$CO$_3$ or NaHCO$_3$. The amount of base should be at least equivalent to the amine hydrohalide formed.

Solvents to be employed are, in particular, halogenated hydrocarbons, preferably chlorobenzene, but toluene, xylene and other halogen-free compounds with good solvent properties can also be used. Mixtures of different solvents can also be used.

Working up of the copolymers is advantageously carried out as follows:

A copolymer solution which contains about 5 - 50% (preferably about 10 - 40%) of a reaction product abtained from an α,ω-dichloropolysiloxane and an α,ω-dihydroxy-oligocarbonate, the amine and the amine hydrochloride in a halogenated hydrocarbon as the solvent is prepared. This copolymer solution is metered into an aqueous sodium bicarbonate solution, while stirring vigorously, and, by continuously feeding in steam, the water is kept at a temperature above the boiling point of the mixture which is formed from water and the solvent and which boils as an azeotrope. During the distillation of the solvent, the copolymer is left behind in the form of coarse-grained particles.

When the addition of the copolymer solution to the hot water, for example by dropwise addition, spraying or atomizing, is complete, steam if further passed in for a short time. A completely odor-free, solvent-free product is isolated and is then dried at about 110° C. If necessary, the product can be further comminuted. However, it is also possible, in order to reduce the particle size of the copolymer, to add to the aqueous phase surface-active agents, such as, for example, saponified copolymers of maleic anhydride and isobutylene, polyacrylates, mineral oil or ligninsulfonates, which prevent agglomeration of the polymer particles. The polymer solution can also be fed in together with steam, by means of a two-component nozzle. In this case particularly fine particles are obtained.

The solvent can be recovered and put to further use. Working up can be carried out under reduced or elevated pressure, at correspondingly lower or higher temperatures. Preferably, working up is carried out at temperatures of about 30° C to 130° C. Working up can be carried out both in a discontinuous procedure and in a continuous procedure. The polymer is dried either in vacuo at temperatures of about 50° - 150° C, in a belt drier or in a conventional drying screw.

The process according to the invention will be illustrated in even more detail with the aid of the examples which follow (% data are % by weight):

EXAMPLE 1

113 g (0.05 mole) of an α,ω-dihydroxy-oligocarbonate (average molecular weight 2,260) of the formula

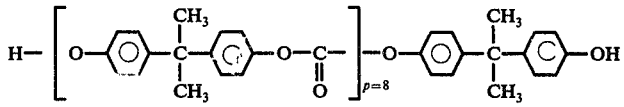

are dissolved in 600 ml of chlorobenzene. After dissolving, the solution is heated further to 134° C and the water is distilled therefrom. 50 ml are taken off, using a water separator. The mixture is then allowed to cool to 90° C and 13.5 g (0.15 mole) of pyridine are added to the chlorobenzene solution. 194 g (0.05 mole) of an α,ω-dichloropolydimethylsiloxane (1.83% of Cl) are then added. The reaction mixture is kept at 80 - 90° C for 4 hours.

When the reaction time has ended, the copolymer solution is cooled to room temperature and subjected to steam distillation. 2 l of a 1% strength aqueous solution of NaHCO$_3$ (97° C) serve as the liquid in the receiver. The copolymer solution is then added dropwise to the NaHCO$_3$ solution while simultaneously passing in steam and while stirring vigorously. The copolymer precipitates as a coarse-grained powder and the chlorobenzene and pyridine are distilled over. When the addition is complete (about 3 hours), steam is further passed in for a further half an hour. The powder which has precipitated is then filtered off and dried. After drying at 110° C (3 hours), 297 g (97%) of a solvent-free product are obtsined. When cast from a CH$_2$Cl$_2$ solution, the block copolymer which contains 37.2% of polycarbonate and 62.8% of polysiloxane gives a soft, clear, elastic film.

Softening point: 195° C
Melting point: above 280° C.

EXAMPLE 2

110 g (0.03 mole) of an oligocarbonate which is of the formula indicated in Example 1, with $p = 13.5$ and which thus has an average molecular weight of 3,660 are dissolved in 700 ml of chlorobenzene. After distilling off 50 ml of chlorobenzene using a water separator, the solution is allowed to cool to 90° C and 7.2 g (0.09 mole) of pyridine are added. Subsequently, 116.4 g (0.03 mole) of the α,ω-dichloropolysiloxane used in Example 1 are added. After a reaction time of 4 hours at 80° - 90° C no further increase in the viscosity of the reaction mixture could be determined. The copolymer solution is then added dropwise, in the course of 2 hours, to 2 l of a 1% strength aqueous solution of NaHCO$_3$ and, differing from Example 1, this addition is made below the surface of the aqueous solution. After the steam distillation has been completed, water has been separated off and the residue has been dried, a product with an average particle size of 3 - 4 mm is obtained (yield: 219 g (98%). The copolymer, which contains 49% of polycarbonate and 51% of polysiloxane, has a softening point of > 280° C and a melting point of > 280° C. When cast from CH$_2$Cl$_2$, a clear, firm, elastic film is obtained.

It will be appreciated that the instant specification and examples are set forth by way of illustration and not limitation, and that various modifications and changes may be made without departing from the spirit and scope of the present invention.

What is claimed is:

1. In the preparation and working up of a SiOC-linked polysiloxane/polycarbonate copolymer comprising reacting an α,ω-dihydroxy-oligocarbonate in the presence of a tertiary amine and a solvent, and subsequently separating off the resulting copolymer from the reaction mixture additionally containing the amine, amine hydrochloride and organic solvent, the improvement which comprises subjecting the reaction mixture to steam distillation at a pH of about 7 to 8 whereby the copolymer remains behind.

2. The process according to claim 1, wherein the steam distillation is carried out by adding the reaction mixture to an aqueous solution which has the pH value of about 7 to 8, whereby the amine, hydrogen chloride, solvent and water distill over, leaving a solid precipitate of copolymer.

3. The process according to claim 2, wherein a surface active agent is present in the aqueous solution whereby the copolymer particles are of fine size.

* * * * *